Jan. 31, 1939.  L. M. BUTTON  2,145,246
PRESSURE CONTROL VALVE
Filed May 10, 1938  2 Sheets-Sheet 1
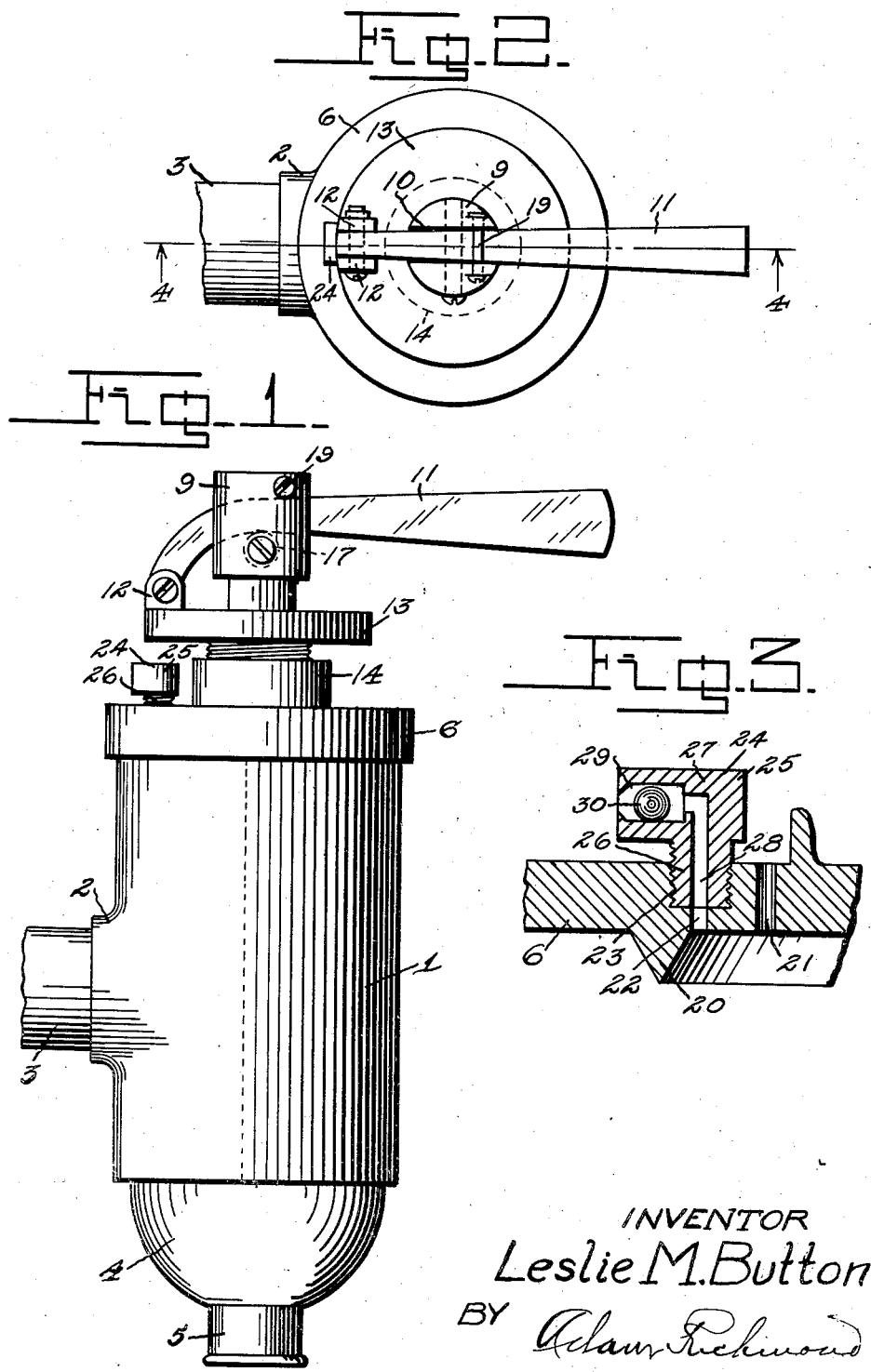
INVENTOR
Leslie M. Button
BY
ATTORNEY

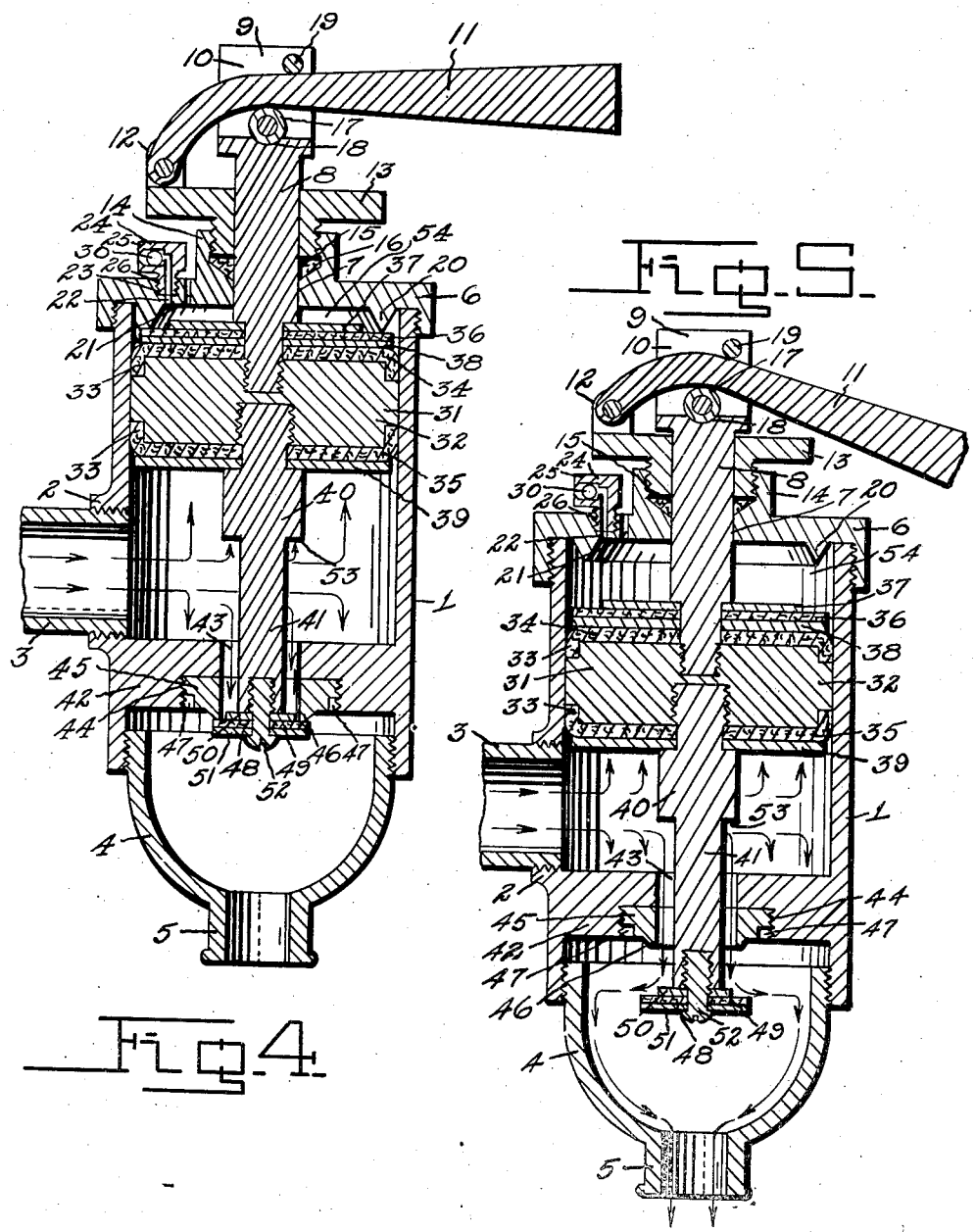

Patented Jan. 31, 1939

2,145,246

UNITED STATES PATENT OFFICE 2,145,246

PRESSURE CONTROL VALVE

Leslie M. Button, Fort Lewis, Wash.

Application May 10, 1938, Serial No. 207,058

1 Claim. (Cl. 251—136)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to a valve or faucet, more particularly it is directed to a hydrostatic piston type of valve for controlling the flow of various types of liquid.

Some of the objects of the invention are to provide a valve which will automatically work successfully by the pressure of the liquid itself for closing the valve and stopping the flow of liquid therethrough, one which has no springs and only one unitary part contained therein, a valve which will act as a check valve in one direction and a relief valve in the other direction and one which may be manually operated with reasonable effort for opening the valve.

Further, it is an object of the invention to provide a valve of the type stated, which is extremely simple in point of application and manipulation, sensitive and efficient in operation, reliable and durable in point of construction and readily taken apart and assembled in the event of repair or replacement of valve parts.

With the above and other objects and advantages in view, the invention consists of certain features of construction and arrangement of parts which will hereinafter appear.

For purposes of illustration, the invention will be claimed with reference to the accompanying drawings in which like numerals distinguish like parts and in which—

Fig. 1 is a side elevation of the invention;

Fig. 2 is a top view thereof;

Fig. 3 is an enlarged vertical sectional view of a ball valve and its connected parts, broken away, which is used in carrying out the invention;

Fig. 4 is a central vertical sectional view taken on the line 4—4 of Fig. 2, showing the valve in an inoperative or closed position, and Fig. 5 is a central vertical sectional view showing the valve in an operative or open position.

In the illustrated embodiment characterizing this invention 1 indicates the body of the valve or faucet, which is in the form of a casing or barrel having an inlet 2, suitably formed for the connection of an intake pipe 3. The lower end of the body 1 is threaded internally for the attachment of a sleeve-like extension 4, one end of which is reduced at 5 for the coupling of an outlet pipe (not shown). The upper end of the body is closed by a screw-threaded cap 6 provided with a central opening 7 for the passage of an operating stem 8 having an enlarged headed end 9 containing a slot 10 for the reception of a portion of a handle or lever 11, which is downwardly curved at one end and pivotally connected to a pair of lugs 12 provided on the upper surface and at the outer edge of a screw nut or gland 13. The screw nut or gland 13 surrounds the stem 8 and is screw-threaded in a rising central internal screw threaded hub (14) formed on the cap 6, the said screw nut or gland being provided for clamping a packing 15 in a chamber 16 formed at the lower portion of the hub 14.

The handle or lever 11 is adapted to contact at its lower edge with a friction or pressure roller 17 rotatably mounted in the bottom of the slot 10 of the stem 8, the bottom portion of the friction or pressure roller 17 being adapted to rotate in a semi-circular groove 18 formed in the head 9 of the stem at the bottom of the slot. In order to retain the lever 11 in the slot 10, a pin 19 is mounted in the head 9 of the stem, which extends across the slot above the upper edge of the lever.

The cap 6 is provided with a downwardly extending annular valve seat 20 on its inner surface, which is substantially V-shaped in section and with a vertical bleeder or Venturi aperture 21 which extends from within the inner surface of the cap 6 to the outer surface thereof. An aperture 22 is also provided in the cap which extends vertically upward from the inner surface thereof, adjacent to the valve seat 20 where it enters an enlarged screw-threaded well or opening 23 formed in the upper surface of the cap 6 for the reception of a ball valve 24, shown enlarged in Fig. 3.

The ball valve 24 comprises a housing 25 having an externally screw-threaded vertically extending portion 26 which is threadably mounted in the well 23 of the cap 6 and with a horizontally extending portion 27. The vertically extending portion 26 is provided with a central opening 28 which communicates with the upper end of the aperture 22 formed in the cap and with the inner end of an enlarged air passage 29 formed in the horizontally extending portion 27, the said air passage 29 being controlled by a ball valve 30.

The lower inner end of the operating stem 8 is reduced in diameter and screw-threaded for the attachment to the upper end of a piston, indicated generally by 31, which is arranged within the body 1 of the valve. The piston 31 comprises a body 32 made of bronze or other suitable material, which is reduced in diameter at its opposite ends for the reception of diametrically opposed annular portions 33 of cup shaped fibre or rubber washers 34 and 35, mounted on opposite ends of the body of the piston. Adjacent to the cup washer 34 on the upper end of the piston is a fibre or rubber washer 36 contained between two brass washers 37 and 38. The fibre or rubber washer 36 and the brass washers 37 and 38 are mounted on the reduced end portion of the stem 8 and clamped between the upper end of the piston and a shoulder formed on the stem by the reduced end portion. The fibre or rubber washer 36 and the brass washer 38 are of substantially the same diameter as the piston, but the brass washer 37 is made smaller in diameter than the piston or the washers 36 and 38 and is adapted to engage the inner surface of the cap 6, between the annular valve seat 20. The fibre or rubber washer 36 is adapted to abut against the lower edge of the annular valve seat 20 at its upper surface. On the cup washer 35 at the inner or pressure surface of the piston 31 is a brass washer 39 which is clamped against the cup washer 35 and the body 32 of the piston by a valve-stem head 40 formed on the upper end of a valve stem 41.

The valve body 1 of the device is formed with a horizontal partition 42 between the inlet 3 and the outlet 5 of the valve, which partition is provided with a valve opening 43, which is enlarged and threaded at 44 at the bottom of the partition for the attachment of a valve seat bushing 45 containing an annular downwardly projecting portion 46. The valve seat bushing 45 is formed of hard metal which will resist corrosion and is provided with suitable slots 47, for the reception of a wrench, whereby the bushing may be placed in position on the partition 42 or removed therefrom when desired. The inner diameter of the bushing 45 is the same as the inner diameter of the upper portion of the opening 43, thus forming a continuous even valve opening through the partition. The downwardly projecting portion 46 of the valve seat bushing 45 forms an annular valve seat for a valve assembly 48 which valve assembly is formed by a fibre or rubber washer 49, which is clamped between two brass washers 50 and 51 by means of a bolt 52, screw-threaded to the lower end of the valve stem 41, the upper end of the valve stem being threadably connected to the lower portion of the piston 31. The lower end of the valve stem 41 is smaller in diameter than the diameter of the valve opening 43 whereby an annular fluid passagway is provided around the valve stem 41 within the valve opening.

In the operation of the device, assuming a liquid having ten pounds of pressure per square inch has entered the body 1 of the valve through the inlet 2, some of this liquid will be forced up against the inner or pressure surface of the piston 31 and the lower surface 53 of the valve-stem head 40, as indicated by the arrows, and some of the liquid will be forced against the inner surface of the valve assembly 48, through the valve opening 43 provided in the partition 42. Now assuming that the total pressure area of the inner or pressure surface of the piston 31 together with the lower surface 53 of the valve-stem head 40 is about two and four-tenths square inches, this means a pressure on the lower surface of the piston of twenty-four pounds. There is, opposing this, a pressure of one and nine-tenths pounds on the lower valve assembly 49 which causes a net pressure of about twenty-two pounds, which is holding the valve assembly 48 closed against its valve seat 46, thus preventing any liquid from passing through the valve opening 43 to the outlet 5 of the device.

As shown in Fig. 5, downward pressure upon the outer end of the operating handle or lever 11 causes the piston 31 and the valve assembly 49 at the bottom end of the valve stem 41, to move downwardly, thus uncovering the valve seat 46 and allowing the liquid to flow out through the valve opening 43 and the outlet 5 at the bottom of the extension 4, as indicated by the arrows in Fig. 5. As the piston 31 moves downwardly air enters the chamber 54 formed above the piston through the bleeder aperture 21 of the cap 6 and through the ball valve 24. When the pressure on the operating handle 11 is released the pressure of the liquid forces the piston upward against the air in the chamber 54. The air in the chamber 54 being forced out by the upward movement of the piston causes the ball 30 to be moved to the outer end of the air passageway 29 of the valve 24, thus closing the air passageway and preventing any escape of air except through the bleeder aperture 21 in the cap 6, whereby the upward motion of the piston 31 is retarded and the piston is caused to move slowly which eliminates hammering and vibration of the piston.

It will thus be seen, that there is provided a highly novel and efficient form of pressure control valve or faucet, which is well adapted for the purpose indicated, even though there has been herein described a device as comprising certain features of construction and operation of parts, it is nevertheless to be understood that various changes may be made therein without departing from the spirit or scope of the invention.

Having described my invention, what I claim as new and wish to secure by Letters Patent is:

In a self-closing valve having a valve body provided with an inlet for liquid under pressure and an outlet and a partition between said inlet and outlet formed with an opening and a valve seat, a valve opening outwardly and cooperating with the valve seat, a cap on the upper end of the body, said cap having a valve seat, an aperture and a capillary opening provided therein, a valve mounted on said cap and having an opening provided therein communicating with the aperture in the cap, means in the last mentioned valve for admitting air in one direction into said body through the aperture in the cap and to prevent any escape of air through said aperture, a piston in the body exposed to liquid pressure and connected to the first mentioned valve and having a greater pressure area than said first mentioned valve, the said piston adapted to cooperate at its upper end with the valve seat on said cap, a stem connected to the piston and cooperating with said cap, a screw nut mounted on the cap and a manual control means pivoted to the screw nut and cooperating with said stem for operating the first mentioned valve through said piston.

LESLIE M. BUTTON.